(12) United States Patent
Donovan

(10) Patent No.: US 7,909,373 B2
(45) Date of Patent: Mar. 22, 2011

(54) EXTENDABLE BUMPER

(76) Inventor: Paul Donovan, Halifax (CA)

( * ) Notice: Subject to any disclaimer, the term of this patent is extended or adjusted under 35 U.S.C. 154(b) by 140 days.

(21) Appl. No.: 12/327,287

(22) Filed: Dec. 3, 2008

(65) Prior Publication Data

US 2009/0152880 A1  Jun. 18, 2009

Related U.S. Application Data

(60) Provisional application No. 61/013,922, filed on Dec. 14, 2007.

(51) Int. Cl.
*B60R 19/38* (2006.01)
(52) U.S. Cl. .................. 293/119; 293/118; 293/133
(58) Field of Classification Search .................. 293/118, 293/119, 133, 3, 4; 296/187.03, 187.09; 180/271, 282, 285
See application file for complete search history.

(56) References Cited

U.S. PATENT DOCUMENTS

| | | | |
|---|---|---|---|
| 3,346,292 A * | 10/1967 | Lundman | 293/9 |
| 3,355,208 A * | 11/1967 | Brock | 293/9 |
| 3,834,483 A * | 9/1974 | Palmer | 180/271 |
| 3,947,061 A | 3/1976 | Ellis | |
| 4,143,735 A * | 3/1979 | Schlanger | 180/274 |
| 4,518,183 A * | 5/1985 | Lee | 293/118 |
| 4,932,697 A | 6/1990 | Hun | |
| 5,011,205 A | 4/1991 | Liu | |
| 5,033,569 A | 7/1991 | Hayes | |
| 5,335,951 A * | 8/1994 | Neri et al. | 293/118 |
| 5,520,428 A * | 5/1996 | Bell | 293/118 |
| 5,967,573 A * | 10/1999 | Wang | 293/119 |
| 6,106,038 A | 8/2000 | Dreher | |
| 6,709,035 B1 * | 3/2004 | Namuduri et al. | 293/118 |
| 6,976,718 B2 * | 12/2005 | Nakanishi | 293/118 |
| 7,192,079 B2 * | 3/2007 | Schramm et al. | 296/187.04 |
| 7,347,465 B2 * | 3/2008 | Jayasuriya et al. | 293/118 |

FOREIGN PATENT DOCUMENTS

WO WO 01/81121 1/2001
WO WO 03/074331 12/2003

* cited by examiner

*Primary Examiner* — Glenn Dayoan
*Assistant Examiner* — Gregory Blankenship
(74) *Attorney, Agent, or Firm* — Sean Zhang; John Orange; Santosh Chari

(57) ABSTRACT

An apparatus is disclosed for extending a bumper on a motor vehicle having driven wheels. The apparatus includes a drive to derive power from the rotating wheels, an actuator for extending the bumper, and a controller for connecting the actuator to the drive. When bumper extension is desired, drive power is transferred from the motor vehicle's rotating wheels to the actuator to effect deployment of the bumper.

20 Claims, 5 Drawing Sheets

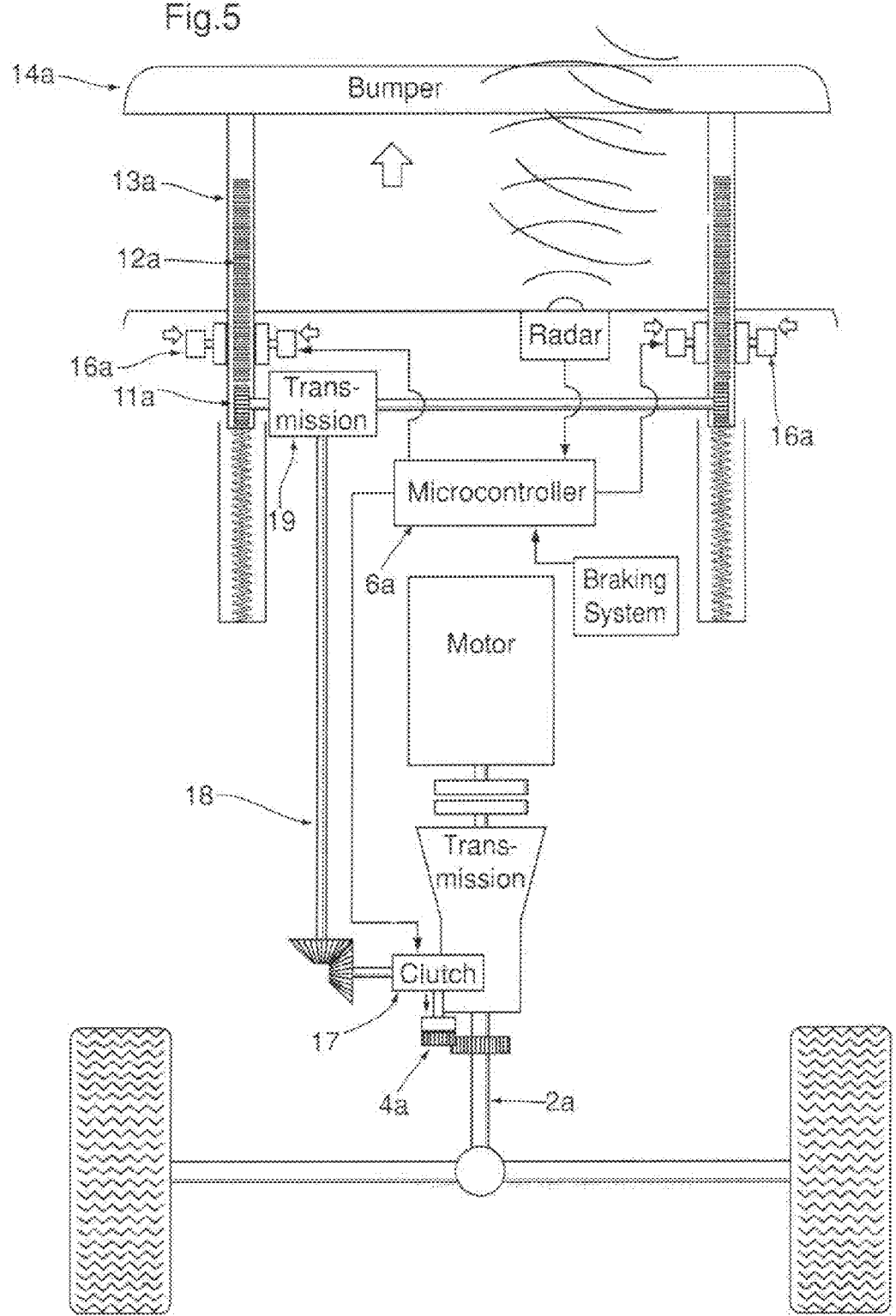

EXTENDABLE BUMPER

CROSS-REFERENCE TO RELATED APPLICATIONS

This application claims priority from U.S. Provisional Application No. 61/013,922 filed on Dec. 14, 2007 incorporated herein by reference.

FIELD OF THE INVENTION

The present invention relates generally to extendable bumpers for motor vehicles.

DESCRIPTION OF THE PRIOR ART

Extendable bumpers are known in the art as a way to minimize damage to a motor vehicle during a collision. The motor vehicle detects or anticipates an oncoming collision and triggers a mechanism to extend the bumper, thereby causing the bumper to absorb the initial impact of the collision. For example, U.S. Pat. No. 5,011,205 to Liu discloses a bumper mounted on two guide rods attached to driving pistons which move the bumper forward when the user applies a sudden and deep depression of the brake pedal. In this design the bumper is powered by the braking mechanism.

In U.S. Pat. No. 4,518,183 to Lee a latch mechanism operated by a control console in the motor vehicle causes a spring to release thereby causing the bumper to move forward. An air bag also inflates upon extension of the bumper providing extra padding between the bumper and the body of the vehicle. A disadvantage of this design is that the extendable bumper is driven forward by an "explosive" discharge, which may be unsafe in situations where the control console mistakenly believes an impending collision is imminent. Moreover, mechanical failure or faulty control circuitry may cause the bumper to deploy and spring forward while the vehicle is stationary.

It is an object of the present invention to address at least some of the above disadvantages.

SUMMARY OF THE INVENTION

In general terms, the present invention provides a drive system for various types of extendable vehicle bumpers that harnesses the kinetic energy of the moving vehicle by using the drive power of one or more wheels to extend forward the bumper. The widespread adoption of anti-lock braking systems has effectively eliminated the locking of vehicle wheels during panic stops, thereby making it more practical to use the drive power of the wheels.

In one aspect of the invention, a system is provided for extending a bumper on a motor vehicle having driven wheels, the system comprising: (a) a drive connected to the wheels to derive power from rotation of the wheels: (b) an actuator for extending the bumper; and (c) a controller for connecting the actuator to the drive, thereby transferring power from the motor vehicle's rotating wheels to the actuator to effect deployment of the bumper.

In one embodiment, the transmission drives both a shaft connected to the wheels and a generator that produces electric power. When the bumper is in its default unextended position the generator is not connected to any load. However, when bumper extension is to occur, a switch connects the generator to an electric motor that extends the bumper outwards. Once the bumper is fully extended, a bumper brake becomes engaged and holds the bumper in its extended position. This acts to resist bumper retraction upon collision, thereby forcing the bumper to absorb the initial impact of the collision. To return the bumper to normal position after extension, the bumper brake is disengaged and power is removed from the electric motor. A spring then returns the bumper to its default position. This embodiment is particularly advantageous since hybrid cars that employ regenerative braking are already equipped with a generator powered by the drive shaft of the vehicle, making adaptation for driving a bumper more viable.

In an alternative embodiment, the system does not employ a generator and electric motor configuration, but instead uses a direct mechanical connection between the drive shaft of the wheels and the mechanism that extends the bumper forward. When bumper extension is desired, a clutch engages a spinning set of gears attached to the drive shaft, thereby transferring rotational power along a shaft to a rack and pinion that extends the bumper forward as the pinion rotates.

Bumper extension is triggered by a processing unit, such as a microprocessor or microcontroller, located in the automobile. The role of the microcontroller is to decide whether a collision is imminent and whether bumper extension is desired. This decision may be based on a number of factors. For example, the microcontroller may utilize a radar signal that measures the distance between the automobile and an oncoming object. If the radar measurements suggest a collision is imminent and the microcontroller detects the brake is fully depressed by the driver, bumper extension is triggered. It will be appreciated, however, that different input measurements may be used by the microcontroller to determine when to trigger bumper extension. For example, the microcontroller may monitor the speed of the vehicle and be configured to prevent bumper extension below a minimum vehicle speed in order to reduce potential injury in collisions with pedestrians. As another example, the microcontroller may additionally receive inputs from a camera and/or an infrared detector. Based on the object's shape and/or object's temperature, the microcontroller may determine that even though a collision is imminent, bumper extension should not be triggered because there is a high probability that the object of collision is a pedestrian. The microcontroller may also monitor whether the ABS is engaged instead of or in addition to monitoring whether the brake pedal is fully depressed by the driver.

BRIEF DESCRIPTION OF THE DRAWINGS

Embodiments of the invention will now be described by way of example only with reference to the accompanying drawings, in which:

FIG. 5 is the top schematic view shown in FIG. 4 after bumper extension.

DETAILED DESCRIPTION OF THE INVENTION

Figure 1:
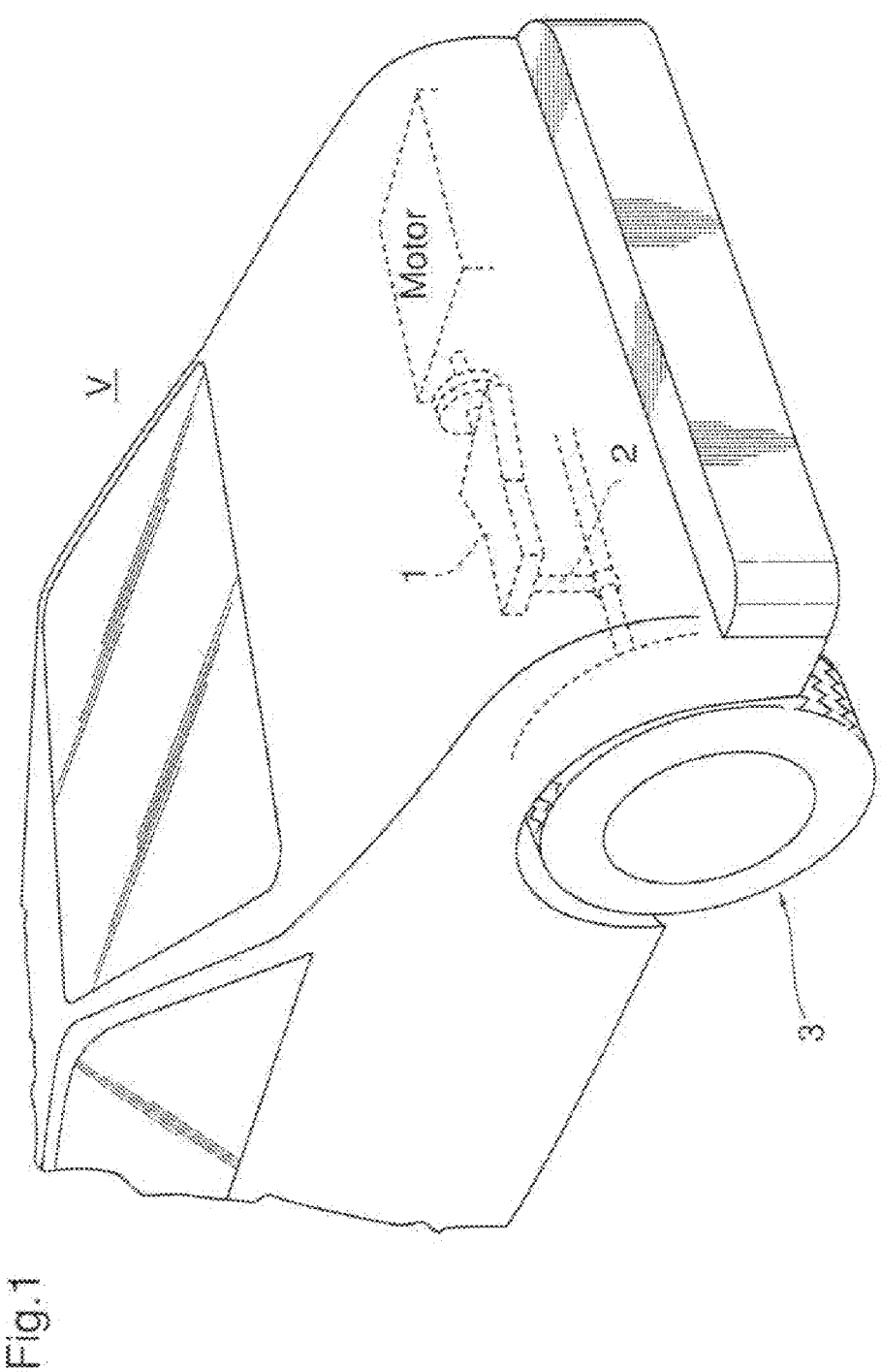
FIG. 1 is a perspective view of the front end of a vehicle.
Figure 2:
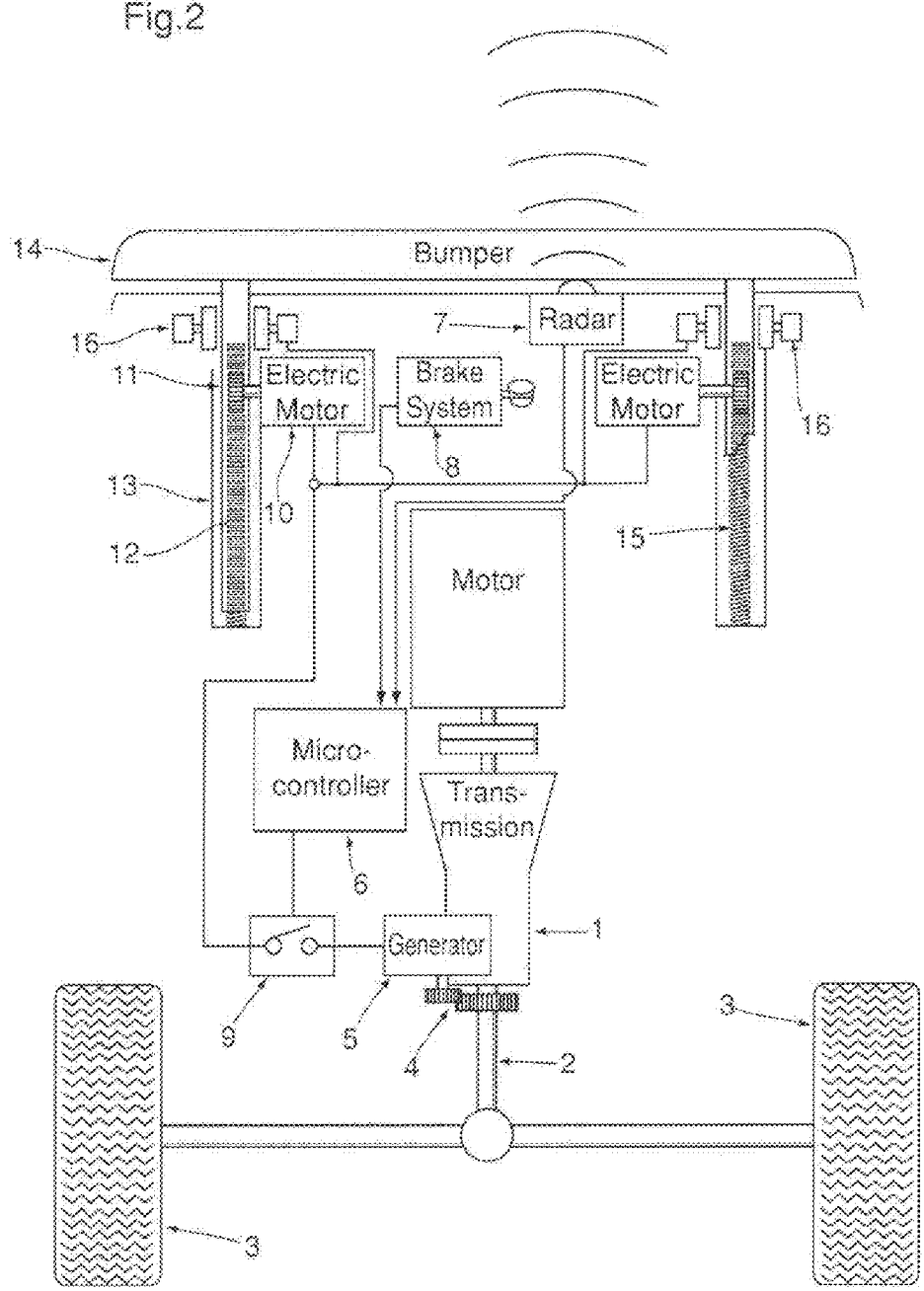
FIG. 2 is a top schematic view of a first embodiment of a drive system for extending a bumper.
Figure 3:
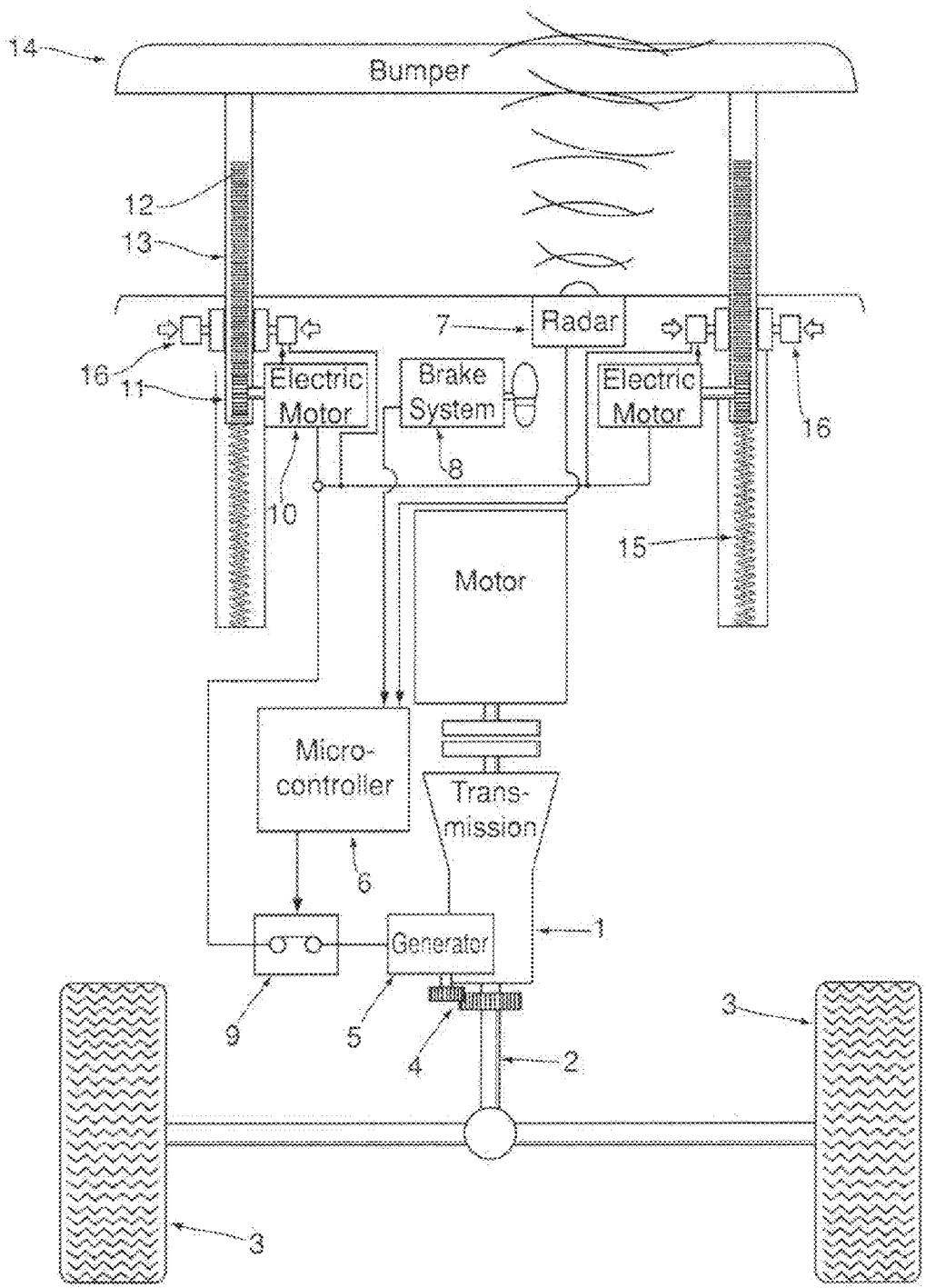
FIG. 3 is the top schematic view shown in FIG. 2 after bumper extension.

Referring to FIG. 1, a vehicle V has a motor that drives a transmission 1. A drive shaft 2 extends from the transmission 1 and turns the wheels 3. In a first embodiment, shown in FIGS. 2 and 3, a set of gears 4 is attached to the drive shaft 2 and drives a generator 5. A switch 9 acts to connect electrically the generator 5 to an electric motor 10. The switch 9 is opened and closed by a microcontroller 6, which receives inputs from a radar system 7 and brake system 8 installed on the vehicle V. The electric motor 10 drives a pinion 11 which engages a rack 12 on an extender arm cylinder 13. The extender arm cylinder 13 is connected to the bumper 14. The electric motor 10 also drives a bumper brake 16, which engages the extender arm cylinder 13 when the bumper 14 is fully extended. A spring 15 acts to keep the bumper 14 in its default position during normal operation and to return the bumper 14 to its default position once bumper extension is no longer desired. Two electric motors are shown in FIG. 2 or 3. It will be appreciated that a single electric motor may be instead be used, but that if two electric motors are used, appropriate provisions would need to be in place to ensure that each electric motor 10 drives its respective pinion 11 at substantially the same speed.

In normal operation, when bumper extension is not desired, the switch 9 is open and the generator 5 has no load. The set of gears 4 turn with the drive shaft 2 and drive the generator 5; however, no electric current is drawn. The microcontroller 6 continually receives inputs from the vehicle's radar system 7 and brake system 8. The microcontroller 6 processes this information and determines if a collision is imminent. For example, a collision is deemed imminent if the sensor information from the radar system 7 suggests collision with an approaching object, and the information from the brake system 8 indicates the driver has fully depressed the brake pedal. It will be appreciated that other collision sensing algorithms may instead be employed. For example, additional microcontroller inputs (not shown), such as vehicle speed, external camera, and infrared detector may also or instead be used to determine whether bumper extension is desired. Bumper extension may not be desired, for example, if the oncoming object is a pedestrian. The microcontroller may also monitor whether the ABS is engaged instead or in addition to monitoring whether the brake pedal is fully depressed by the driver.

Once the microcontroller 6 has deemed bumper extension is desired, it closes the switch 9 which connects electrically the generator 5 to the electric motor 10. The electric motor 10 draws current from the generator 5 to turn the pinion 11 which engages the rack 12 in the extender arm cylinder 13. As the pinion 11 turns, the bumper 14 moves forward.

A spring 15 biases the bumper 14 to its default non-extended position, it will be appreciated that the motor 10 must have enough torque to overcome the force of the spring 15, and that the generator 5 must be able to accommodate the current drawn by the motor 10 while extending the extender arm cylinder 13. In particular, the generator/motor configuration must be selected such that the speed of the rotating drive shaft 2 will allow the generator 5 to generate enough power to ensure the motor 10 is able to fully extend the bumper before the rotating drive shaft 2 drops to too low of a rotation speed.

Once the bumper is fully extended, the bumper brake 16 becomes engaged and holds the bumper 14 in its extended position. If a collision occurs, the bumper brake 16 acts to resist and control the speed of bumper refraction, thereby forcing the bumper 14 to absorb the initial impact of the collision. If a collision is avoided, the microcontroller 6 opens the switch 9, and the motor 10 and bumper brake 16 are no longer powered. The force of the extended return spring 15 returns the bumper to its normal position.

Advantageously, even if the microcontroller 6 were to malfunction and not open the switch 9, once the vehicle V was close to a complete stop, the drive shaft 2 would no longer be turning fast enough to provide the current required to accommodate the motor 10 and bumper brake 16. The motor 10 and bumper brake 16 would lose power, and the bumper would return to its normal position. Similarly, if the vehicle V were stationary, the bumper 14 could never accidentally extend since the generator 5 would not be powered.

It will be appreciated that alternate configurations may be utilized. For example, the brake 16 may be normally engaged with the arm 13 and be released during deployment of the bumper 14. Similarly, the rack and pinion drive may be replaced with another mechanical linear drive, and the drive may be reversible to effect retraction, thereby supplementing or replacing the return spring 15.

Figure 4:
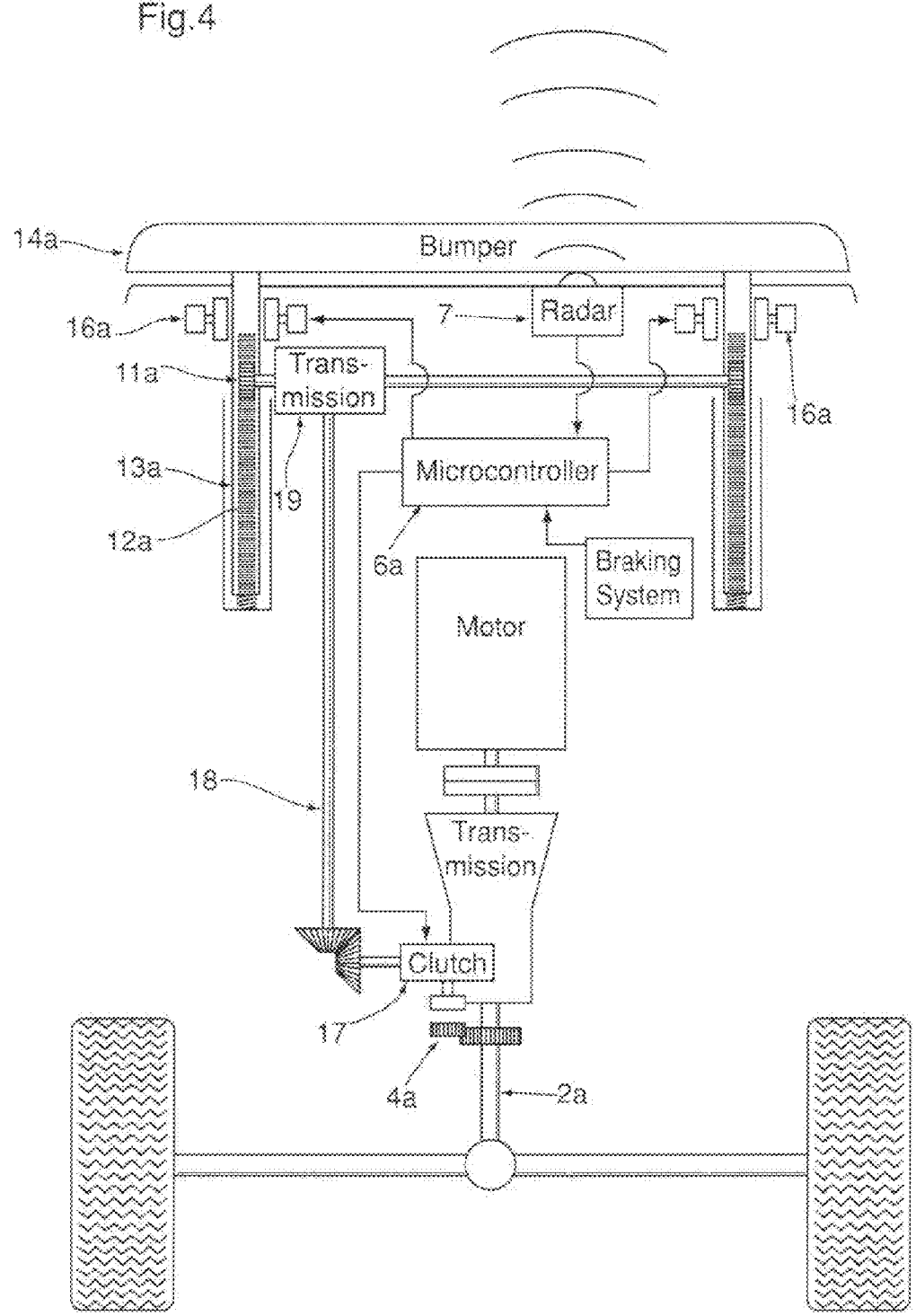
FIG. 4 is a top schematic view of a second embodiment of a drive system for extending a bumper.

Referring now to FIGS. 4 and 5, an alternative embodiment of the invention is shown in which like components are denoted by like reference numerals with a suffix 'a' added for clarity. Instead of the generator and electric motor configuration described above in this embodiment there is a direct mechanical connection between the drive shaft of the wheels and the mechanism that extends the bumper forward. A clutch 17 is used to engage the rotating gears 4a and transfer power via a shaft 18 to turn the pinion 11a.

In normal operation, when bumper extension is not desired, the set of gears 4a rotate with the drive shaft 2a, but do not engage shaft 18. Once bumper extension is triggered by the microcontroller 6a, the clutch 17 engages the rotating gears 4a attached to the drive shaft 2a thereby transferring power via the shaft 18 to turn the pinion 11a, which engages the rack 12a in the extender arm cylinder 13a. As the pinion 11a turns, the bumper 14a moves forward. Additionally, a transmission 19 may also be used to adjust the gear ratios between the gears 4a attached to the drive shaft 2a and the pinion 11a engaging the rack 12a. Once the bumper 14a is fully extended, the microcontroller 6a causes the bumper brake 16a to become engaged and hold the bumper 14a in its extended position. The bumper brake 16a can be powered by any means, but preferably also uses power derived from the drive shaft 2a. All other aspects of this embodiment are the same as that described in the embodiment of FIGS. 2 and 3 described above.

As a further alternative, a hydraulic drive system may be used to harness the power of drive shaft 2a and to drive bumper 14a forward. For example, a hydraulic link may be established between a pump driven by the gears 4a and the pinion 11a to drive the pinion 11a or drive the arm 13a directly.

Although the invention has been described with reference to certain specific embodiments, various modifications thereof will be apparent to those skilled in the art without departing from the spirit and scope of the invention as identified in the claims appended hereto.

What is claimed is:

1. A system for extending a bumper on a motor vehicle having driven wheels upon detection of a triggering condition, said bumper being initially placed in an unextended position when the motor vehicle is moving, comprising:
    (a) a drive connected to said wheels to derive power from rotation of said wheels;
    (b) an actuator for extending said bumper; and
    (c) a controller for selectively connecting said actuator to said drive upon detection of the triggering condition, thereby transferring power from said motor vehicle's rotating wheels to said actuator to extend said bumper from said unextended position during motion of said motor vehicle.

2. The system of claim 1 wherein said actuator further comprises a returning mechanism for returning said bumper back to its unextended position once power to said actuator is removed.

3. The system of claim 2 wherein said returning mechanism comprises a spring.

4. The system of claim 2 wherein said actuator further comprises a bumper brake for resisting bumper retraction upon collision.

5. The system of claim 1 wherein said actuator comprises an arm connected to said bumper, and an electric motor for driving said arm.

6. The system of claim 5 wherein said drive comprises a generator powered by a rotating drive shaft, said rotating drive shaft being connected to and rotated by said motor vehicle's transmission; said controller comprises a switch for making an electric connection between said generator and said electric motor; and wherein the system further comprises a microcontroller for controlling said switch, said microcontroller configured to close said switch when said microcontroller determines bumper extension is desired.

7. The system of claim 6 further comprising a bumper brake for engaging said arm when said bumper is extended to resist bumper retraction upon collision.

8. The system of claim 7 further comprising a returning mechanism for returning said bumper to its unextended position; said returning mechanism comprising a spring biased to position said arm in its unextended position.

9. The system of claim 5 wherein said actuator further comprises a rack and pinion; said electric motor drives said pinion during bumper extension; and said rack is connected to said arm.

10. The system of claim 6 wherein said microcontroller determines bumper extension is desired by processing at least one input signal selected from the group comprising: a radar signal, a camera, the vehicle speed, a signal indicating whether the ABS is engaged, a signal indicating whether the brake pedal is fully depressed, and an infrared signal.

11. The system of claim 6 wherein said microcontroller determines bumper extension is desired if said microcontroller receives a signal indicating the approach of an oncoming object and said microcontroller also receives a signal indicating the brake pedal is fully depressed.

12. The system of claim 1 wherein said drive comprises a set of gears rotated by a drive shaft connected to said motor vehicle's transmission.

13. The system of claim 12 wherein said actuator comprises an arm and a rack and pinion, said arm being connected to said bumper and driven by said rack, whereby said bumper is extended forward when said pinion rotates; and wherein said controller comprises a clutch connected to one end of a shaft, said shaft's other end connected to said pinion, said clutch configured to engage said set of gears when bumper extension is desired and thereby transfer rotational power along said shaft to turn said pinion and extend said bumper.

14. The system of claim 13 further comprising a microcontroller for controlling said clutch to engage said set of gears when said microcontroller determines bumper extension is desired.

15. The system of claim 13 further comprising a bumper brake for engaging said arm when said bumper is extended to resist bumper retraction upon collision.

16. The system of claim 15 further comprising a returning mechanism for returning said bumper to its unextended position once said clutch is disengaged from said set of gears; said returning mechanism comprising a spring biased to position said arm in its unextended position.

17. The system of claim 14 wherein said microcontroller determines bumper extension is desired by processing at least one input signal selected from the group comprising: a radar signal, a camera, the vehicle speed, a signal indicating whether the ABS is engaged, a signal indicating whether the brake pedal is fully depressed, and an infrared signal.

18. The system of claim 14 wherein said microcontroller determines bumper extension is desired if said microcontroller receives a signal indicating the approach of an oncoming object and said microcontroller also receives a signal indicating the brake pedal is fully depressed.

19. The system of claim 13 further comprising a transmission for adjusting gear ratios between said set of gears and said pinion.

20. The system of claim 1 wherein said actuator comprises an arm connected to said bumper; the system further comprising a hydraulic drive system, said hydraulic drive system driven by said drive and said hydraulic drive system driving said arm.

* * * * *